UNITED STATES PATENT OFFICE.

OTTO KIPPE, OF OSNABRÜCK, GERMANY.

PROCESS OF MAKING BRIQUETS.

1,078,544.

Specification of Letters Patent. Patented Nov. 11, 1913.

No Drawing. Application filed August 5, 1913. Serial No. 782,751.

*To all whom it may concern:*

Be it known that I, OTTO KIPPE, a citizen of the German Empire, and a resident of Osnabrück, Germany, have invented a new and useful and Improved Process of Making Briquets, of which the following is a specification.

The present invention is based upon the discovery that a certain special kind of dust derived from furnace gases, to wit, the substance hereinafter more particularly described and referred to as filter dust, is capable of developing an unusual capacity as a binder, particularly for ore briquets when briquets containing such filter dust are treated with steam under pressure.

The filter dust which is the specific material to which this application is directed is the dust caught by the filters in furnace practice in which solid particles are eliminated from the furnace gases by means of what is know as the dry process such as is described for instance in German Patent No. 250,394 as distinguished from the well known wet process in which after the flue dust proper has settled out of the furnace gases, the latter are passed through wet catchers in which the remaining dust settles as a mud or slime. Neither the flue dust proper (for reasons explained below) nor the slime even when dried are contemplated as the binding medium of this application since I am concerned solely with the fine dry particles which are caught by the filters in a process in which the addition of excessive moisture to the furnace gases is avoided in the treatment of these gases after the flue dust proper has settled from them and before the gases come into contact with the filters.

The particular substance with which I am concerned is known in the art as filter dust which is a dust in a state of extremely fine sub-division, so fine that it floats along with the furnace gases without being separated from them when the flue dust proper is precipitated or caught. This fine filter dust contains very little iron but is apparently composed in the main of silica ($SiO_2$), alumina ($Al_2O_3$) and lime ($CaO$). According to one theory this filter dust is created by means of the vaporization which takes place at the twyers of the blast furnace, i. e. at the place where the highest temperature prevails. According to another theory the metals silicon, aluminum and calcium are supposed to exist in the zone of the highest temperatures in the form of elements, this being due to the reducing atmosphere, and these elements are considered when they meet with oxygen to burn up so as to create this filter dust which is carried away by the furnace gases and is recovered in the final filtering operation as employed in the dry process.

Whatever may be the exact chemical composition of the filter dust, it is a substance which is passed through the blast furnace and has been subjected therein to the blast furnace conditions just as much as flue dust. The filter dust, however, differs radically from flue dust. A given quantity of filter dust has been analyzed as containing the following ingredients in the following percentages: $SiO_2$—29%, $Al_2O_3$—20%, $CaO$—27%, Fe—4%. It also contained in small percentage magnesium oxid, potassium oxid etc. Flue dust on the other hand is substantially a reduced iron containing from 40 to 50% of iron, and 10 to 20% carbon. Flue dust may therefore generally be considered as a partially reduced iron produced by frictional disintegration. The filter dust on the other hand cannot be considered as ore but if it is to be given a general classification may be classified as a slag relatively poor in lime. It is, of course, as explained, not really a slag but a composition probably of many ingredients, the entire composition being peculiar to itself due to the manner of its creation. This filter dust has heretofore been considered a practically useless product and in fact its removal or disposal has been a source of difficulty and expense. According to experience prior to this invention this filter dust could operate as ballast only but I have now discovered that it possesses a most remarkable and astonishing faculty of causing cohesion in a briquet when treated with steam under pressure. I have discovered that a briquet composed of a mixture of fine ore and the like, generally called fines, and the dry filter dust will, if simply mixed without any special previous treatment produce briquets of very considerable rigidity or firmness when they are treated with steam under pressure. Considering the filter dust as a binder I have found that even with the addition of so small a percentage as 5 to 10% of the binder, briquets can be made which satisfy all the requirements of a briquet in blast furnace operation. In other words, the binding capacity of filter dust in connection with the hardening of the briquet when treated with steam under pressure appears to be quite remarkable and the observation that filter dust develops these qualities when treated with steam under pressure constitutes a discovery of a new and wholly unexpected effect because theoretically one would imagine that briquets so formed would possess no hardness at all and would not in the least satisfy the requirements of the furnace practice since the filter dust, as the result of being separated in the dry state at low temperature, would have lost any and all capacity to act as a binder (if it has such capacity at the start) by the intimate contact with the damp furnace gases containing carbonic acid.

The process of briqueting is very simple in practice. The ores or similar substances to be briqueted are mixed in an ordinary mixing machine with the filter dust and this mixture is then briqueted or pressed into the desired shapes and with the desired pressure. These briquets thus made are placed upon what are known as hardening wagons and are then caused to become hardened with steam under pressure in hardening kettles, such for example as are employed in the manufacture of calciums and stone, and after a few hours are thereby converted into briquets capable of use in a blast furnace.

The foregoing process has great advantages over those heretofore known, being extremely simple in operation and employing, as it does to effect the binding together of the ore, a material which has been heretofore totally discarded and treated as a waste product of furnace works.

The remarkable binding capacity of the filter dust may of course be availed of in connection with other substances than fine ores, and consequently it should be understood that the particular material which is bound in the briquet is in a way secondary to the main invention, (though included within the scope of my claim).

The invention being primarily designed to be of use in connection with blast furnace operations, it is obvious that the briquets may contain other materials which are valuable for smelting operations either alone or in admixture with the ores, and such ores or other material may be considered to constitute the body material of which the briquets are composed. The uses to which these briquets are intended are primarily such uses as are connected with smelting or blast furnace operations so that the body material of the briquets is a material which melts at high temperatures such as are employed in blast furnaces.

It is of course obvious that other binding media can be employed in addition to the filter dust and such practices are included within the scope of the claim, so long as the filter dust and the steam treatment of the briquets are made use of.

What I claim is:

The process of making briquets composed in the main of fine ores or body material which consists in mixing said body material with a percentage of filter dust, briqueting the mixture and treating the briquets formed of said mixture with steam under pressure.

In testimony whereof I have hereunto set my hand in the presence of two subscribing witnesses.

OTTO KIPPE.

Witnesses:
LUDWIG ABNER,
ERNST H. L. MUNNENHOFF.